Oct. 6, 1931.  F. W. ROLLER  1,826,024
ELECTRIC WEIGHING APPARATUS
Filed Oct. 31, 1925  2 Sheets-Sheet 1
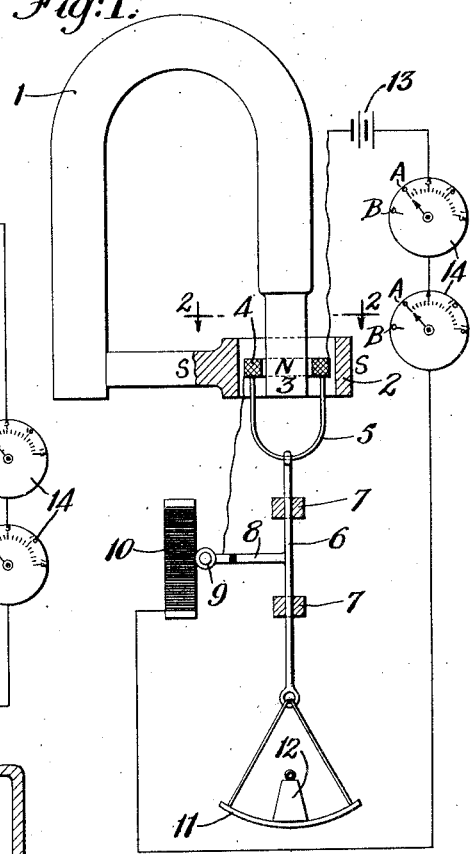
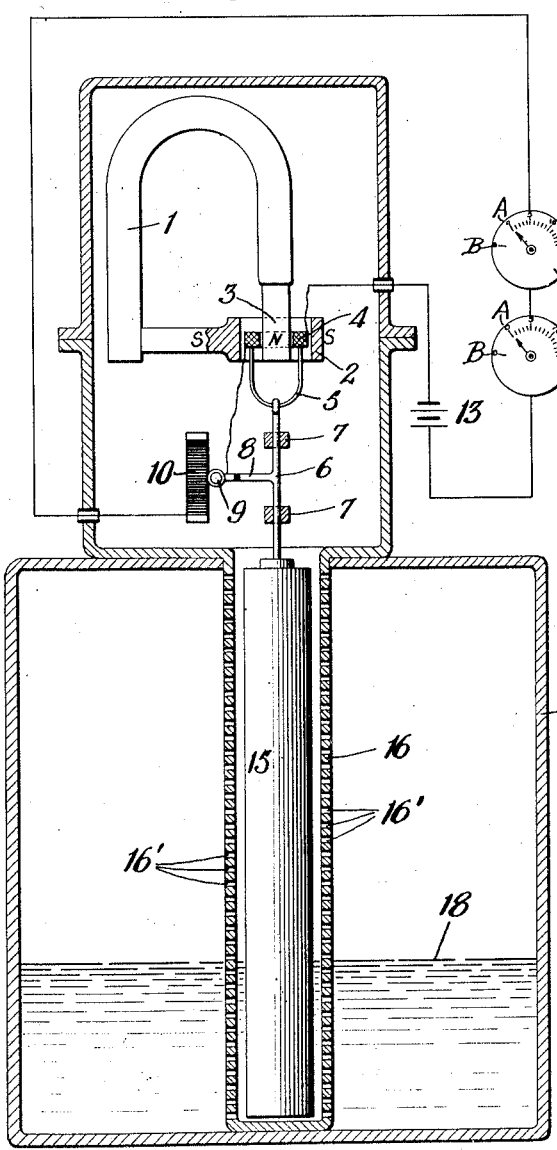
Inventor
Frank W. Roller
By his Attorneys
Edwards, Sager + Bower Oct. 6, 1931.  F. W. ROLLER  1,826,024
ELECTRIC WEIGHING APPARATUS
Filed Oct. 31, 1925   2 Sheets-Sheet 2
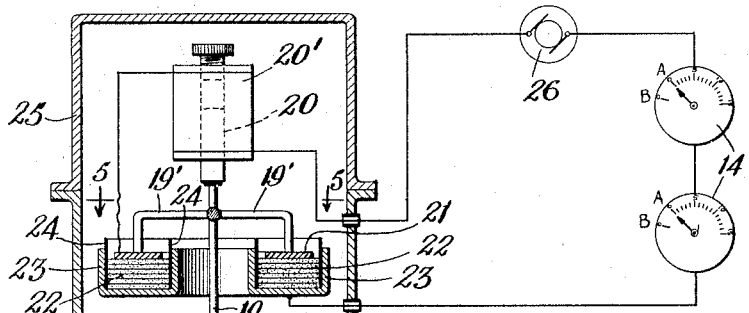
Fig:4.
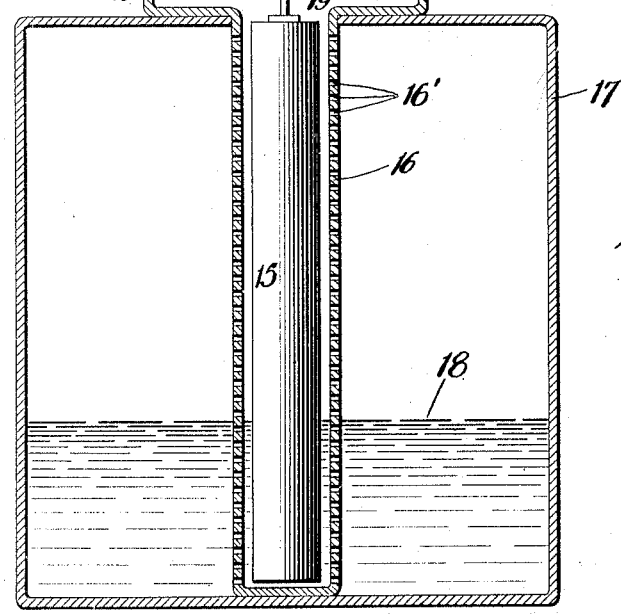
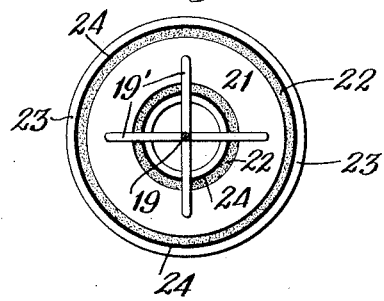
Fig:5.
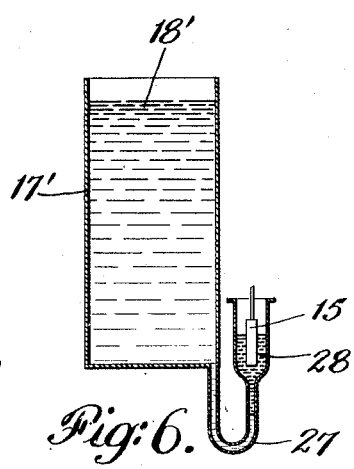
Fig:6.
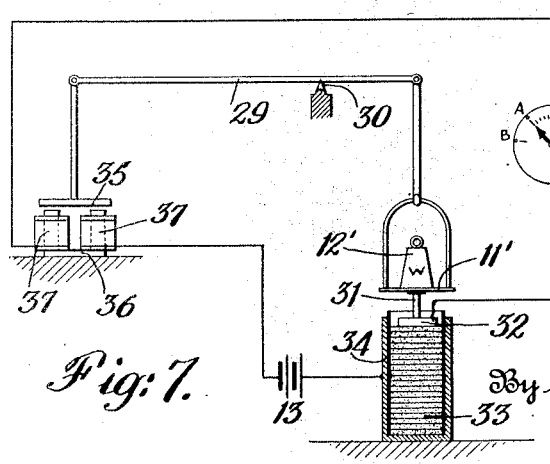
Fig:7.
Inventor
Frank W. Roller.
By his Attorneys
Edwards, Sager + Bower.

Patented Oct. 6, 1931

1,826,024

UNITED STATES PATENT OFFICE

FRANK W. ROLLER, OF EAST ORANGE, NEW JERSEY, ASSIGNOR TO ROLLER-SMITH COMPANY, A CORPORATION OF NEW YORK

ELECTRIC WEIGHING APPARATUS

Application filed October 31, 1925. Serial No. 65,911.

This invention relates to apparatus for measuring and indicating electrically the value of a mechanical force, such as the weight of any body, the pressure exerted by fluid whether it be air, gas, or liquid, and various other uses and applications.

One of the principal objects of the invention is to provide an improved apparatus whereby the electrical indication of measurement of the force may be placed at any desired location, the indicating instrument being capable of being placed at any desired distance from the apparatus where the force to be measured is located; and this may be accomplished by merely running a pair of wires to the indicating instrument. Another object and advantage of the invention is that it enables any desired number of indicating instruments to be used, located at widely separated places if desired, for indicating the force or weight measured. Another object is to obtain the above advantages by improved apparatus of simple form of construction, as well as being durable and reliable and also secure a sufficient degree of accuracy in measurement for the purposes to which the invention may be applied. Other objects and advantages of this invention will be understood from the following description and accompanying drawings.

Fig. 1 is a side view partly in section and partly diagrammatic, illustrating one embodiment of this invention; Fig. 2 is a plan view partly in section on the line 2—2 of Fig. 1; Fig. 3 is a view similar to Fig. 1 showing another application of the invention; Fig. 4 is a similar view of a modification; Fig. 5 is a plan view on the line 5—5 of Fig. 4; Fig. 6 is a vertical section showing another application of the invention, and Fig. 7 is a side view partly in section and partly diagrammatic of another modification of the invention.

Referring to Figs. 1 and 2, a permanent magnet 1 is shown as having a polar extension 2 in the form of a hollow cylinder. The other polar extension 3 of the magnet is centrally located within the polar extension 2. These poles being of opposite polarity, a uniform magnetic field is directed radially across the space between the two poles. Within this field is located an annular coil 4 formed of several turns of wire and its depth in an axial direction is relatively small compared to the axial length of the field between the two poles, thus permitting a considerable upward and downward movement of the coil 4 without passing beyond the limits of the uniform magnetic field. The coil 4 is carried by a fork 5 on a rod 6, which rod passes through fixed guides 7 so as to be freely movable vertically and guide the coil 4 in its vertical movement so that it will maintain a central position of the coil with reference to the poles of the magnet and avoid contact therewith during any part of the vertical movement. The rod 6 carries an arm 8 which extends sidewise and in turn carries an insulated contact 9, which makes movable contact with a stationary variable resistance 10. This resistance may be in the form of a bare resistance wire wound in the form of a coil on a suitable insulating support and against which the contact 9 makes electrical contact directly, or the rheostat may be in any suitable form. Obviously when the contact 9 is moved vertically, it will change the amount of resistance included in a circuit passing through the contact 9. At the lower end of the rod 6 is a scale pan 11 adapted to receive any object to be weighed, such as the weight 12.

A source of direct current is indicated at 13 and included in the circuit therefrom are shown two electrical indicating instruments 14, 14, which may be any desired form of ammeter. The circuit after passing through these instruments in series continues to one terminal of the variable resistance 10, thence through a portion of this resistance to contact 9 and thence by a flexible lead through the coil 4 and thence by another flexible lead to the other terminal of the source 13. The resistance 10 and slidable contact 9 should preferably be of such form of construction as to have an infinite number of changes in resistance by the movement of the slidable contact, and in practice the change of resistance between successive resistance steps may be made such as to suit the particular purpose and requirements.

With proper direction of current flowing through the coil 4 with reference to the direction of the magnetic field, it is evident that a certain value of current will create an upward electro-dynamic force, which will be just sufficient to balance the weight of the parts carried by the coil 4, such as the fork 5, rod 6, pan 11 and weight 12. If the weight 12 be changed to a smaller amount, the current in coil 4 for sustaining the weight will be correspondingly reduced, as the magnetic field is constant. Similarly a heavier weight will correspondingly increase the current in coil 4 for sustaining the increased weight. Consequently, if the current in coil 4 be varied to correspond with the weights to be measured and a floating or balancing of the parts be obtained with the different weights, the current passing through the circuit above described will indicate the weight of the body 12, after allowing for the weight of the other parts of the apparatus. In accordance with the present invention, this change of current to correspond with the change of weight is secured by a change in the resistance 10 included in the circuit by a change in the vertical position of the movable parts and of the contact 9.

For example, assume that in the position of the parts shown in Fig. 1, they have attained a balanced position and that a current is flowing through coil 4, which is just sufficient to hold the parts in the approximate mid-position shown. The contact 9 is then engaged at about the middle position of the resistance 10 and about half of this resistance is included in the circuit. The particular value of current then flowing will cause the needles of the instruments 14 to assume a position corresponding to that value of current. If the weight 12 be increased, the parts will move to a lower position in the magnetic field, because the increased weight will overcome the previous electro-dynamic force exerted by the former current. The downward movement causes the resistance 10 in circuit to be decreased with resulting increase of current through the coil 4 until it is sufficient to balance the increased weight. The instruments 14 will then indicate the increased value of current which will correspond to the increased weight. Similarly, the parts will occupy a different vertical position for different weights and the instruments will indicate the corresponding current value, provided the range of the apparatus is such that the coil 4 remains within the uniform field and a balanced condition be secured in each case.

The instruments 14 may obviously be calibrated to directly read the weights in any desired units of measurement, so as to permit the weights to be read directly from the instrument scales. When there is no weight in the pan 11, the parts will rise to the highest position and the current will be correspondingly reduced; and as this current value indicates no weight in the scale pan, the calibration of the instrument scales will result in this position A being indicated by zero on the weight scale, although a certain value of current is passing at the time. Furthermore, it is evident that if the circuit described be broken, no current will pass through the instruments and the apparatus will move downwardly to its lowest position and be stopped by the engagement of the fork 5 with the upper guide 7, or by engaging any other suitable stop. With this open circuit condition, the needles of the instruments will move to zero current position indicated at B. This position may be marked on the scale of the instruments to indicate that the apparatus is not in operative condition.

The apparatus in measuring any weight or force is independent of voltage changes in the source 13, because the weight or force measurements are dependent solely upon the value of current through the coil 4. For example, if the voltage of the source should fall, the tendency to reduce the current in coil 4 with a given weight would be offset by the coil 4 and parts attached thereto falling to a lower position until sufficient resistance of the resistance 10 is cut out of the circuit to cause the current in the circuit and in coil 4 to assume the value corresponding to the weight measured; upon increase in voltage of the source, a corresponding compensation occurs by the parts assuming a higher position with an increased amount of resistance in the circuit.

It is evident that the instruments 14 may be located at any desired positions, being in separate rooms or buildings if desired and that any desired number of such indicating instruments can be used. The use of more than one such indicating instrument at different locations is often desirable where the weights measured are checked or supervised by more than one person, or where the same person wishes to observe the weight measured when he happens to be in different locations.

Fig. 3 illustrates a modification where the invention is embodied in apparatus for the measurement and indication of the level of a liquid contained in a receptacle. Examples of such use would be the indication of the amount of gasolene in an automobile tank, the indication of level in a water-tank, or any storage tank containing liquid, where it is desirable to have the indicating instrument at a location convenient for observation. In this figure the parts designated by the same reference characters are the same as in Figs. 1 and 2, but in the place of the scale pan carrying the weight, the rod 6 carries at its lower end an elongated cylinder or weight 15. This is suspended within a metal cylindrical cage 16 having a number of perforations 16'. The cage 16 is shown inserted through the top of a receptacle or tank 17 containing the liquid 18, the level of which is to be indicated. The cage 16 will extend within the tank 17 to the bottom thereof and have perforations 16' at the bottom of the cage, when it is desired to measure the level of the liquid to substantially the bottom of the tank.

Obviously when the tank is full, or nearly full, the downward weight or force exerted by the cylinder or plunger 15 will be less than that exerted when the tank is empty or nearly empty; but whatever the liquid level may be, the current through the coil 4 will correspond thereto for the reasons already explained. The instruments 14 may be calibrated to indicate the level in any convenient unit for liquids having the same specific gravity; and with a given size of tank, the scale of the instruments may be calibrated to read directly in gallons or any desired unit of measurement.

Fig. 4 shows a modified form of the invention. Here the apparatus is also shown adapted for the measurement of a weight 15 as affected by the change in level of a liquid in a tank, these parts being numbered to correspond with the same parts in Fig. 3. In Fig. 4, however, a rod 19 is secured to the top of the plunger 15 and carries at its upper end a core 20 of a solenoid magnet having the coil 20'. Extending from the rod 19 are radially projecting arms 19' having downwardly turned ends which engage the upper surface of a ring 21, as shown in Fig. 5. Beneath the ring 21 are located a stack of thin annular carbon disks 22, which are carried by and have electrical contact with the bottom of an annular metal cup 23. The edges of the disks 22 are insulated from the sides of the cup 23 by insulating collars 24. The parts are shown enclosed in the separable casing 25.

A source of current is indicated at 26 and the circuit therefrom passes through the indicating instruments 14 in series with each other, thence to the metal cup 23 and through the pile of carbon disks 22 to the top plate 21 and thence by flexible lead through the solenoid 20' and then back to the source 26. The cup containing the carbon disks is stationary, as is likewise the solenoid coil 20'.

In this form of construction, the metal cup 23 and carbon disks or rings and plate or ring 21 form a carbon rheostat wherein the resistance decreases as the pressure thereon increases. It is evident that with a certain weight or downward force exerted upon the rod 19, the same will be balanced by the upward pull of the solenoid coil 20' and the pressure exerted upon the carbon rheostat. This will result in the passage of a certain current through the circuit corresponding with the downward force or weight upon the rod 19 and attached parts. When the level of the liquid changes, or the weight to be measured changes, the apparatus will result in the passage of a current through the circuit corresponding with the change. If the weight becomes lighter, the solenoid tends to raise its core to a higher position, which increases the resistance of the carbon rheostat and when the forces are in balance, the current flowing in the circuit will be reduced to correspond with the decrease in weight. Similarly when the weight is increased, the current will be correspondingly increased when the balanced condition is secured. The scales of the instruments 14 may be calibrated to read directly in the units desired.

In some cases the depth of the liquid to be measured in a tank may be so great as to make it inconvenient to employ a float element extending the full depth of the tank, in the manner as shown in Figs. 3 and 4. This situation may be overcome by the arrangement indicated in Fig. 6, wherein the level of the liquid 18' in a tank 17' is to be measured. Here a U-shaped tube 27 is connected at one end to the bottom of the tank 17' and the other enlarged end of the tube 27 is filled with a liquid 28 having an appropriately higher specific gravity than that of the fluid in the tank 17'. The plunger 15 of Figs. 3 and 4 is introduced in the liquid 28, as indicated in Fig. 6. Obviously the level of the liquid 28 in the tube 27 will vary in proportion with change of level of the liquid in tank 17'. The indicating instruments 14 will thus indicate any change of level of liquid in the tank 17'.

In Fig. 7 a further modification of the invention is illustrated, wherein counterbalancing forces are applied at opposite ends of a fulcrumed lever. This modification may be employed where very large weights or forces are to be measured. A lever 29 is shown fulcrumed on the support 30. At one end of the lever is a scale pan 11' having the weight 12' thereon to be measured. In practice, this scale pan may take the form of a platform. Secured to and extending below the pan is a rod 31 carrying a metal plate 32. This plate engages the top of a pile of carbon disks or plates 33 forming a compressible and expansible carbon rheostat. The carbon pile is insulated at the sides from the metal container 34.

At the opposite end of the lever 29 is pivotally secured a rod carrying the armature 35 of an electromagnet shown as having a U-shaped core 36 and a pair of coils 37 on the upwardly extending arms of the core, the poles of which are adapted to attract the armature 35. From the source of current 13, the circuit extends through the coils 37, indicating instrument 14 to plate 32 of the carbon rheostat, thence through the disks 33 to the metal container 34 and then back to the source 13.

The range of movement of the apparatus is within sufficient limits to secure the desired degree of accuracy. Evidently with a certain weight 12' to be measured, the apparatus will assume a balanced condition, the electromagnetic pull on the armature 35 balancing the weight on the right-hand portion of the lever 29. Under this condition, the carbon pile rheostat is compressed to the amount necessary to cause a current to flow in the circuit sufficient to give the necessary counterbalancing electromagnetic force. The value of the current passing will therefore measure the weight 12' by direct indication on the instrument 14 for the reasons already explained. Any change in the weight 12' will be correspondingly reflected in a change of current through the circuit and give a corresponding indication by the instrument 14, whose scale may be calibrated in any desired units.

The invention is susceptible of various modifications and capable of various applications according to the requirements of any particular case, without departing from the scope of this invention.

I claim:—

1. Apparatus for measuring a weight comprising a magnet having a substantially uniform magnetic field, one polar extension of said magnet being in the form of a hollow cylinder and the other centrally located within said hollow cylinder, an annular coil movable within said field and within said hollow cylinder, its depth in the axial direction being relatively small compared to the axial length of the field between poles to permit considerable upward and downward movement of said coil without passing beyond the limits of the uniform magnetic field, means for connecting said weight to said coil so as to exert a force on said coil in opposition to the magnetic force, a source of current in circuit with the winding of said annular coil, a variable resistance connected in series with said coil, the variable controlled member of which is mechanically connected with said annular coil causing the current of said circuit to vary in accordance with the position occupied by the annular coil, and a device for indicating the current in said circuit.

2. Apparatus for measuring a force comprising a magnetic device having a fixed element and a movable element, said movable element being magnetically functionally related to said fixed element, one of said elements being a winding, a variable resistance, a source of current and an indicating instrument in circuit with said winding, and means for applying the force to be measured against said movable element to cause the same to assume different balanced positions according to the value of the force and for adjusting said resistance to a value to cause the current in said winding to be such as to balance the force to be measured when said movable element is in a position corresponding to the value of the force to be measured.

3. Apparatus for measuring a force comprising a magnetic device having a fixed element and a movable element, said movable element being magnetically functionally related to said fixed element, said movable element being movable in a longitudinal direction and one of said elements being a winding, a variable resistance, a source of current and an indicating instrument in circuit with said winding, and means for applying the force to be measured against said movable element in the line of movement of said movable element to cause the same to assume different balanced positions according to the value of the force and for adjusting said resistance to a value to cause the current in said winding to be such as to balance the force to be measured when said movable element is in a position corresponding to the value of the force to be measured.

4. Measuring apparatus comprising a member having a limited range of movement in opposite directions, an electromagnetic means tending to move said member in one direction, means whereby said member may be subjected to a force to be measured tending to move it in the opposite direction, a variable resistance mechanically connected to said member whereby said last mentioned movement decreases its effective resistance, a source of electric current, a measuring instrument and a circuit connecting said electromagnetic means, variable resistance, source of current and measuring instrument in series.

FRANK W. ROLLER.